US012686582B2

(12) United States Patent
Lammers et al.

(10) Patent No.: US 12,686,582 B2
(45) Date of Patent: Jul. 21, 2026

(54) TOOLING APPARATUS AND METHOD FOR APPLYING MATERIAL TO A PRE-FORMED INSERT

(71) Applicant: TIARA YACHTS, INC., Holland, MI (US)

(72) Inventors: Scott Lammers, Holland, MI (US); Matthew Brown, Holland, MI (US); Jordan Fragel, Holland, MI (US); Christopher Rumsey, Holland, MI (US); Ernesto Oquendo, Holland, MI (US)

(73) Assignee: TIARA YACHTS, INC., Holland, MI (US)

( * ) Notice: Subject to any disclaimer, the term of this patent is extended or adjusted under 35 U.S.C. 154(b) by 105 days.

(21) Appl. No.: 18/392,335

(22) Filed: Dec. 21, 2023

(65) Prior Publication Data

US 2024/0208755 A1    Jun. 27, 2024

Related U.S. Application Data

(60) Provisional application No. 63/434,653, filed on Dec. 22, 2022.

(51) Int. Cl.
B29C 70/38 (2006.01)
B65H 23/06 (2006.01)
(Continued)

(52) U.S. Cl.
CPC ......... B65H 23/063 (2013.01); B29C 70/388 (2013.01); B29K 2309/08 (2013.01); B29L 2031/307 (2013.01); B65H 2404/14 (2013.01)

(58) Field of Classification Search
CPC ............ B29C 53/82; B29C 2053/8025; B29C 70/388; B29C 70/32; B65H 23/063
See application file for complete search history.

(56) References Cited

U.S. PATENT DOCUMENTS

| | | | |
|---|---|---|---|
| 3,063,888 A | 11/1962 | Howard | |
| 3,420,721 A | 1/1969 | Bayless | |
| | (Continued) | | |

FOREIGN PATENT DOCUMENTS

EP    0181747 A2    5/1986

OTHER PUBLICATIONS

Ge (Machine Translation of CN112829134, Publication May 25, 2021) (Year: 2021).*

*Primary Examiner* — Michael A Tolin
*Assistant Examiner* — Hana C Page
(74) *Attorney, Agent, or Firm* — Varnum LLP

(57) ABSTRACT

A tooling apparatus for applying a tape material to a pre-formed insert is provided. The tooling apparatus comprises at least one guiding element coupled to an apparatus frame. An attachment shaft defines a rotational axis and extends through the guiding element. The attachment shaft includes an attachment element for securing the pre-formed insert thereto. An activation element is operatively engaged with the attachment shaft to rotate the pre-formed insert about the rotational axis at a predetermined rotation rate. A tape control assembly is spaced from the attachment shaft for axial translation along a tape control axis at a predetermined translation rate. Rotation of the pre-formed insert about the rotational axis and translation of the tape control element at the predetermined translation rate causes the material to be drawn under tension from the tape control assembly and applied to the pre-formed insert in a plurality of layers.

12 Claims, 12 Drawing Sheets

(51) Int. Cl.

*B29K 309/08*          (2006.01)
    *B29L 31/30*           (2006.01)

(56)                    References Cited

U.S. PATENT DOCUMENTS

| | | | |
|---|---|---|---|
| 3,616,000 | A | 10/1971 | Butzow |
| 4,077,576 | A | 3/1978 | Cook, Jr. |
| 4,258,960 | A | 3/1981 | Harris |
| 4,596,619 | A * | 6/1986 | Marks .................. B29C 53/581 |
| | | | 156/425 |
| 4,710,255 | A * | 12/1987 | Takeuchi ............. B29C 53/828 |
| | | | 156/425 |
| 4,718,369 | A | 1/1988 | Pollard |
| 4,938,824 | A * | 7/1990 | Youngkeit ................ F02K 9/97 |
| | | | 156/173 |
| 5,074,950 | A | 12/1991 | Myers |
| 5,681,612 | A | 10/1997 | Benedict |
| 2009/0294567 | A1 | 12/2009 | Witmer et al. |
| 2018/0290334 | A1 | 10/2018 | Corsmeier |
| 2019/0022919 | A1 | 1/2019 | Verlaek et al. |
| 2019/0160760 | A1* | 5/2019 | Pages-Xatart .......... B29C 70/38 |
| 2021/0016522 | A1* | 1/2021 | Futakuchi ............. B29C 64/209 |
| 2021/0245452 | A1* | 8/2021 | Boroughs .............. B65H 35/06 |
| 2023/0123780 | A1* | 4/2023 | Autry ................... B29C 66/543 |
| | | | 264/402 |

\* cited by examiner

TOOLING APPARATUS AND METHOD FOR APPLYING MATERIAL TO A PRE-FORMED INSERT

CROSS REFERENCE TO RELATED APPLICATIONS

This application claims the benefit of U.S. Provisional Application No. 63/434,653, filed Dec. 22, 2022, which is hereby incorporated by reference in its entirety.

TECHNICAL FIELD

The subject innovation pertains to a tooling apparatus for applying a material to a pre-formed insert. More specifically, the innovation relates to a tooling apparatus and method for applying at least one continuous strip of fiberglass tape material under tension to a pre-formed insert to form a marine implement.

BACKGROUND

Traditional fiberglass lay-up techniques are known in the art. For example, hand lay-up methods generally include steps of cutting a fiberglass material (woven, knitted, stitched, or bond fabrics) to size and positioning the same inside or about a mold. A resin is then applied using a brush, roller, or spray process to create a fiberglass laminate, and a topcoat is applied for aesthetic purposes and enhanced laminate protection.

However, production of certain components, such as those relating to marine implements, may require a more robust or thicker application of the fiberglass material. In such instances, when consolidated under vacuum pressure, the fiberglass material may tend to buckle due to the increased amount of material applied to the mold, which can create waves, wrinkling, or other topical irregularities in the surface of the resulting implement. Such irregularities are often undesirable from a visual and structural quality standpoint, and, as such, an apparatus and method for forming such implements with a more robust or thicker application of fiberglass material absent such topical irregularities in the fiberglass implement is desirable in the market.

SUMMARY

A tooling apparatus for applying a material to a pre-formed insert is provided. The tooling apparatus comprises an apparatus frame with a guiding element and an attachment shaft that defines a rotational axis. The attachment shaft is operatively coupled to the apparatus frame at the guiding element and is adapted to receive the pre-formed insert thereon such that the pre-formed insert is configured for rotation about the rotational axis. An activation element is operatively engaged with the attachment shaft to facilitate rotation of the attachment shaft and the pre-formed insert about the rotational axis at a predetermined rotation rate.

A tape control assembly is spaced apart from the attachment shaft and capable of axial translation along a tape control axis at a predetermined translation rate, wherein the tape control axis is spaced apart from and substantially parallel with the rotational axis. Actuation of the activation element and thereby rotation of the pre-formed insert about the rotational axis at the predetermined rotation rate, and translation of the tape control assembly at the predetermined translation rate, causes the material to be drawn under tension and applied from the tape control assembly to the pre-formed insert in a plurality of overlapping layers, wherein the plurality of overlapping layers defines a predetermined arrangement. Said another way, the material is applied to the pre-formed insert with hoop-wise tensioning created by wrapping the material about the pre-formed insert as the pre-formed insert rotates about the rotational axis as defined by the present method of this disclosure.

According to another aspect of the innovation, utilizing the tooling apparatus of the present disclosure, a marine implement may be formed via the present method. The present method for forming the marine implement (or another implement requiring a more robust or thicker application of fiberglass material in formation) includes steps of: loading a pre-formed insert onto an attachment shaft of a tooling apparatus, the attachment shaft defining a rotational axis, wherein the tooling apparatus further comprises an apparatus frame having a guiding element, and wherein the attachment shaft is operatively coupled to the apparatus frame at the guiding element such that the pre-formed insert is configured for rotation about the rotational axis; applying a tackifier to the pre-formed insert; tensioning at least one continuous strip of fiberglass tape material with a tensioning system of a tape control assembly operatively coupled to the apparatus frame; wrapping the at least one strip of fiberglass tape material under tension about the pre-formed insert thereby forming a plurality of overlapping layers of the at least one strip of fiberglass tape material, wherein at least one of the plurality of overlapping layers of the at least one strip of fiberglass tape material is disposed in contact with an exterior surface of the pre-formed insert; and unloading the pre-formed insert from the attachment shaft of the tooling apparatus.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The embodiments set forth in the figures are illustrative and exemplary in nature and not intended to limit the subject matter. The following detailed description of the illustrative embodiments can be better understood when read in connection with the following figures, wherein like structures are indicated with like reference numerals and in which.

DETAILED DESCRIPTION

Figure 1:
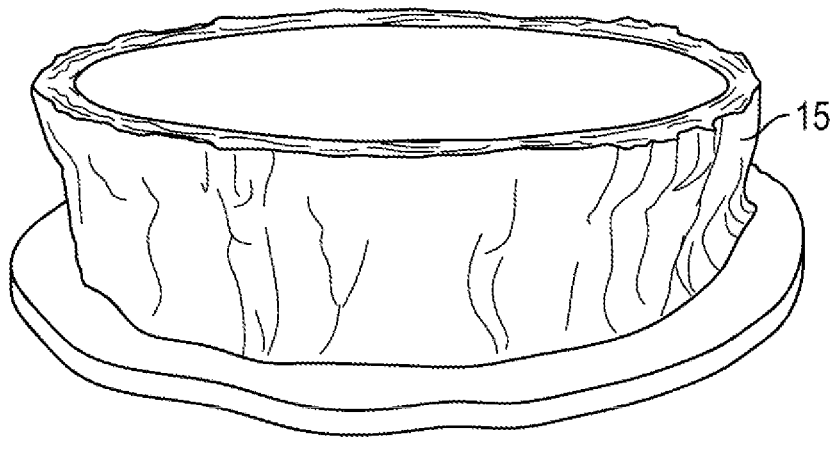
FIG. 1 is a schematic illustration of a front perspective view of a marine implement formed via a prior art vacuum infusion method.

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. The term "forward" or "anterior" is used to refer to the general direction from back to front, and the term "rearward" or "posterior" is used to refer to the opposite direction, i.e., the direction from the front to back. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. In addition, the term "proximal" refers to a direction that is nearer and the term "distal" refers to a relative position that is further away. Thus, the terms proximal and distal may be understood to provide generally opposing terms to describe relative spatial positions.

Referring to the Figures, wherein like numerals indicate like or corresponding parts throughout the several views, a tooling apparatus for applying a material 12 to a pre-formed insert 14 is shown generally at 10. In a general sense, the tooling apparatus 10 allows for the material 12 to be applied with hoop-wise tensioning, which is accomplished via rotationally applying or wrapping the pre-formed insert 14 with a plurality of overlapping layers of the material 12, thereby defining a predetermined arrangement. Said another way, the material 12 is applied to the pre-formed insert 14 under sufficient tension such that the plurality of overlapping layers of the material 12 are resistant to buckling or wrinkling when consolidated under vacuum pressure, as present with prior art implementations shown by example in FIG. 1. The tooling apparatus 10 can thereby be utilized to form, for example, a marine implement, such as a fiberglass-based boat hull component 15, shown in FIG. 2, in which the absence of buckling or wrinkling is typically desirable.

Figure 3:
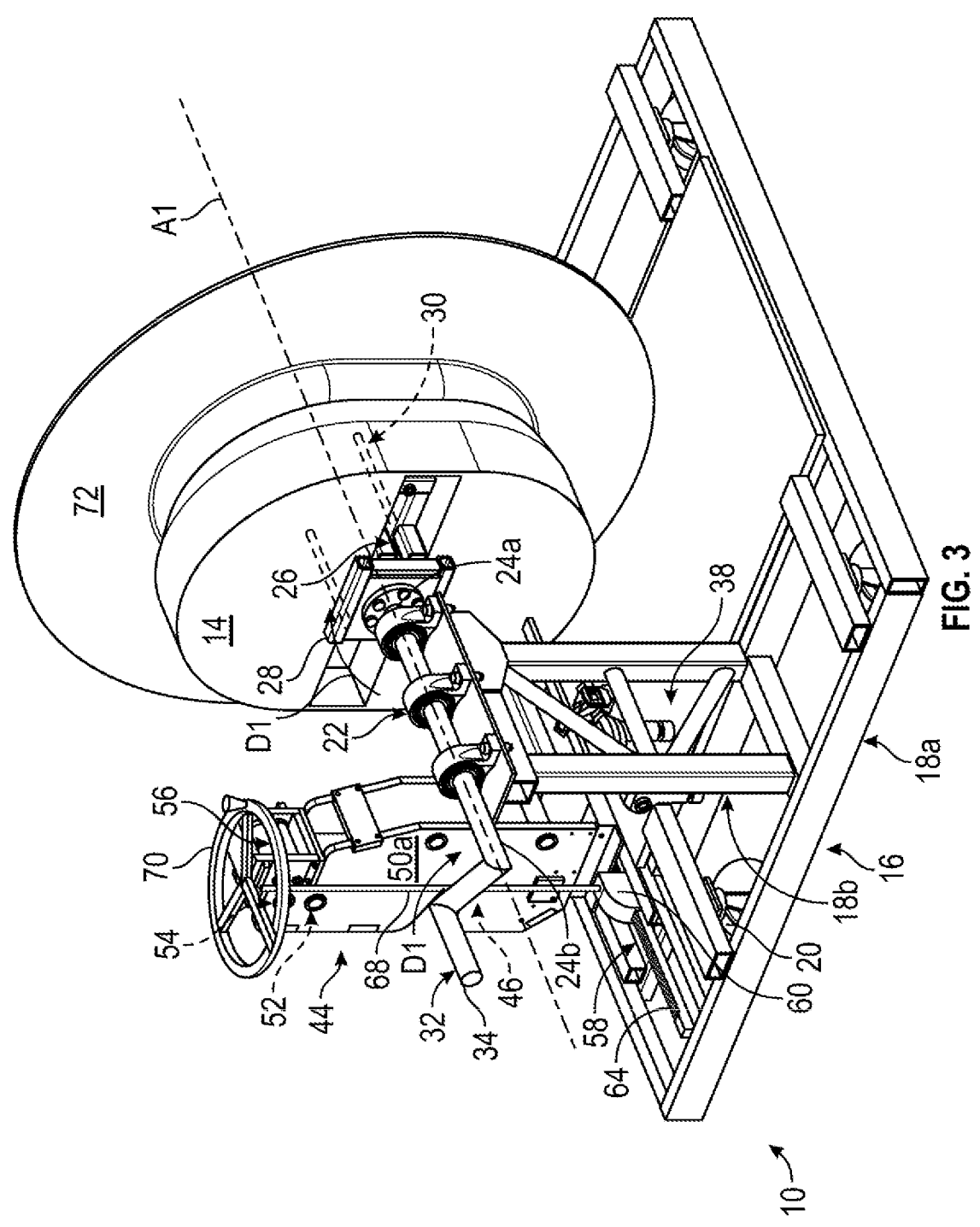
FIG. 3 is a schematic illustration of a rear perspective view of a tooling apparatus for applying a material to a pre-formed insert according to a first example embodiment of the present disclosure.
Figure 4:
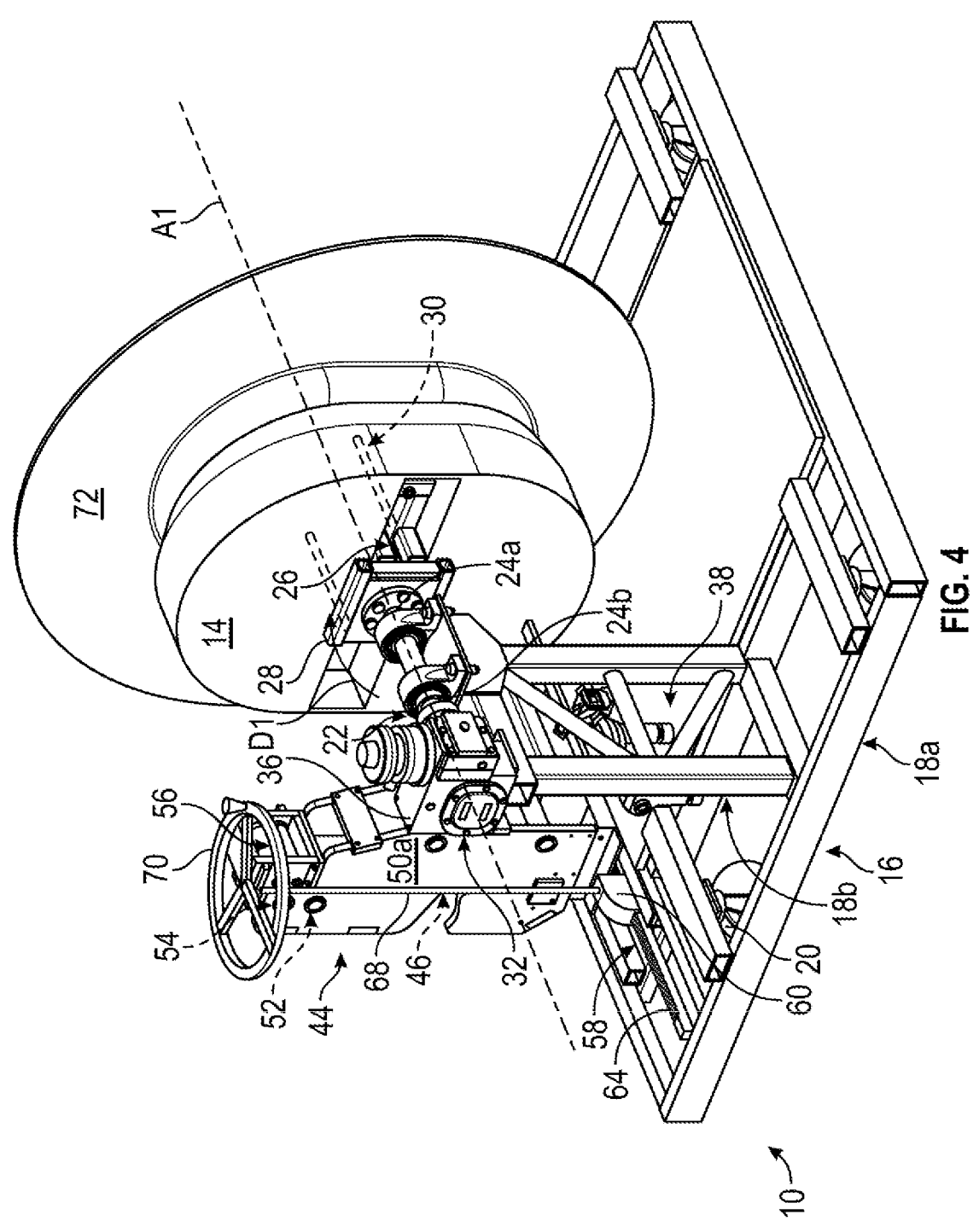
FIG. 4 is a schematic illustration of a rear perspective view of a tooling apparatus for applying a material to a pre-formed insert according to a second example embodiment of the present disclosure.
Figure 5:
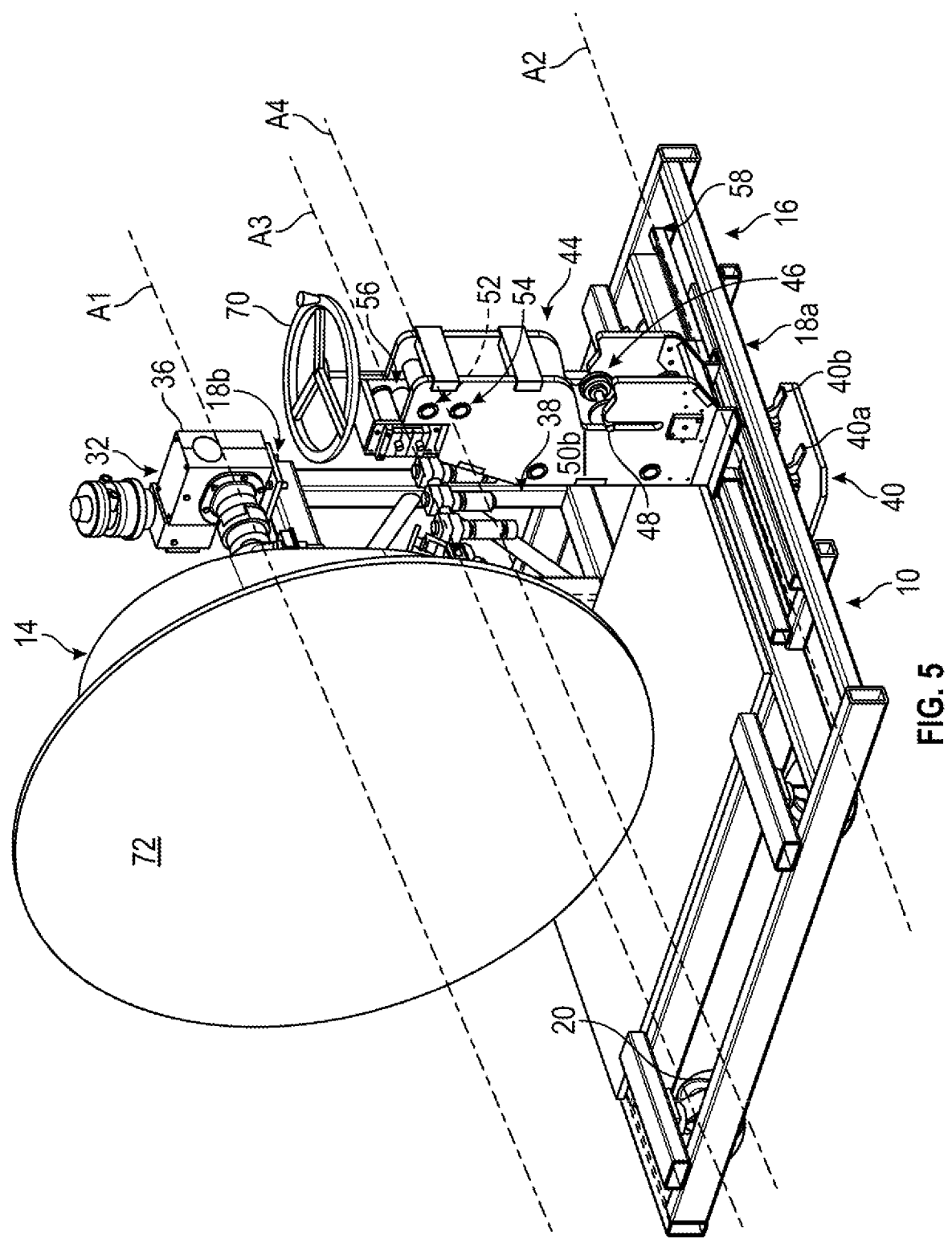
FIG. 5 is a schematic illustration of a front perspective view of the tooling apparatus of FIG. 4.
Figure 6:
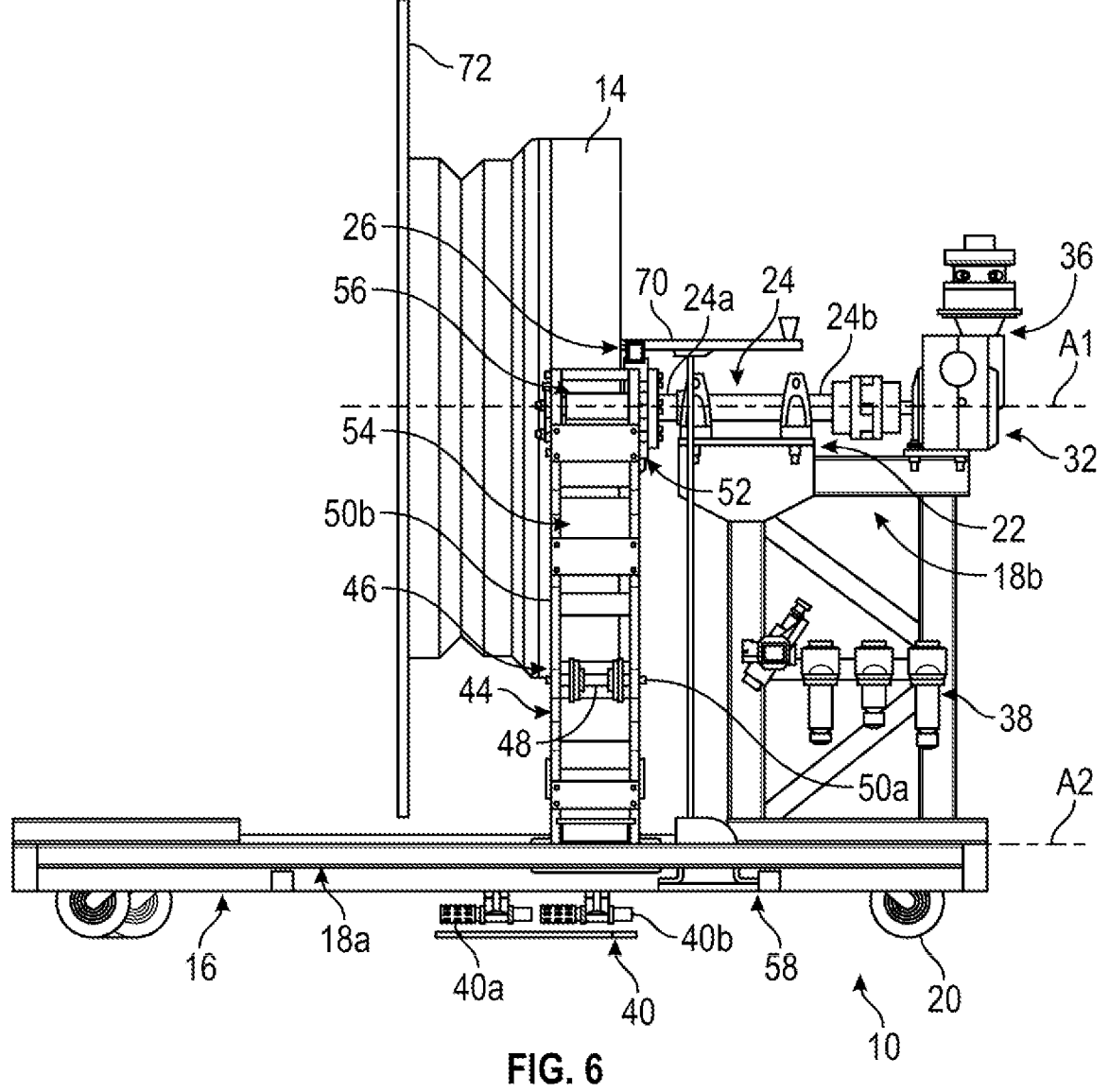
FIG. 6 is a schematic illustration of a front view of the tooling apparatus of FIG. 4.
Figure 7:
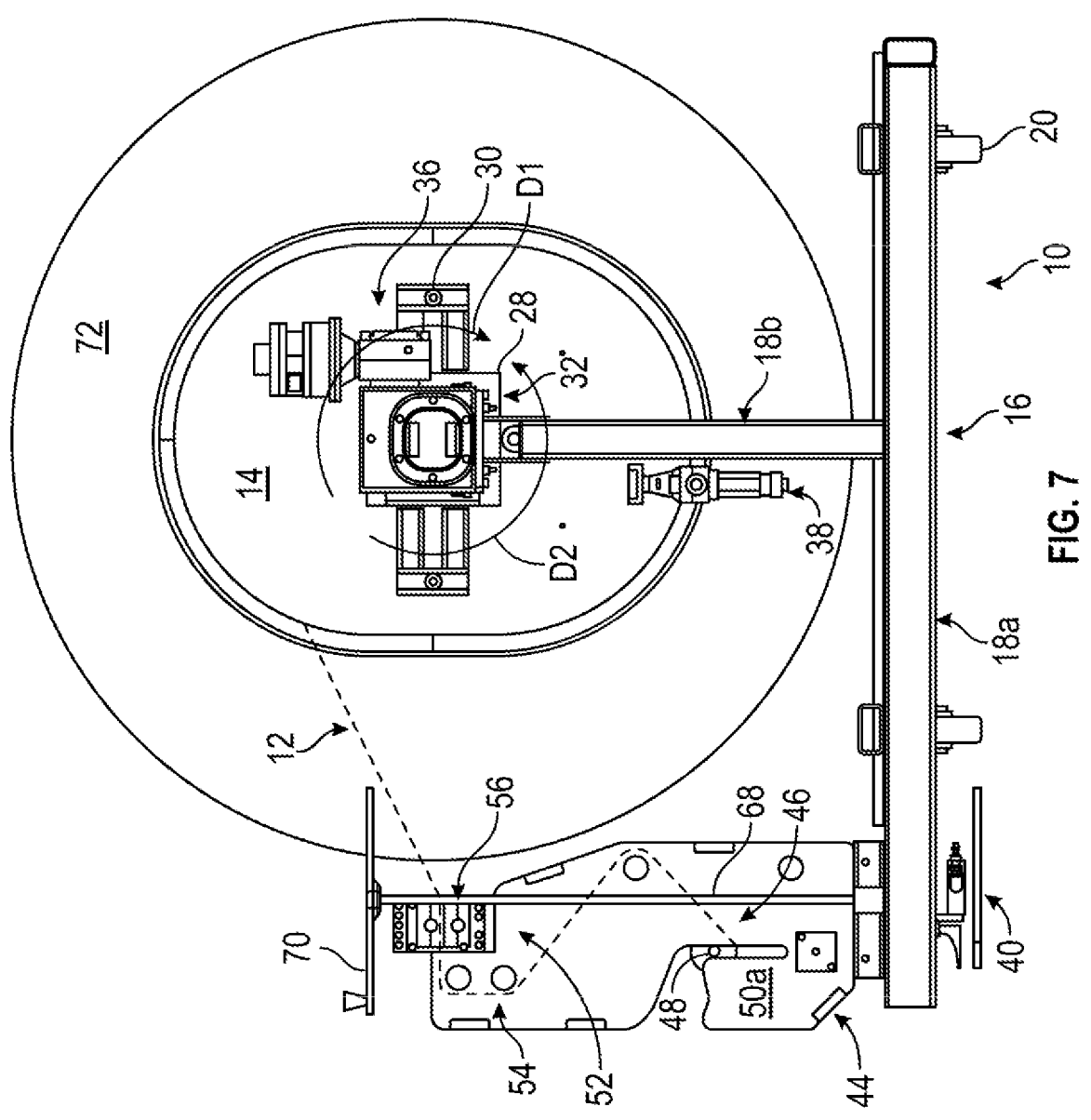
FIG. 7 is a schematic illustration of a side view of the tooling apparatus of FIG. 4.

Referring to FIGS. 3-7, the tooling apparatus 10 comprises an apparatus frame, shown generally at 16, having a first plurality of supports 18a adapted for stabilizing the tooling apparatus 10 on a surface or substrate, such as a floor of a manufacturing facility, and a second plurality of supports 18b extending upward therefrom and terminating at a distal portion spaced vertically from the first plurality of supports 18a. A plurality of casters 20, as shown in FIGS. 6 and 7, may be affixed to the first plurality of supports 18a and extend downward therefrom for engaging the floor and facilitating repositioning of the tooling apparatus 10 thereon. Referring to FIGS. 3-4 and 6, the distal portion of the second plurality of supports 18b includes at least one guiding element 22, such as, in one non-limiting example, a pillow block bearing. The at least one guiding element 22 is disposed on the distal portion of the second plurality of supports 18b.

The tooling apparatus 10 further comprises an attachment shaft 24 having a rotational center and extending along a longitudinal axis, i.e., a rotational axis A1 that extends substantially parallel to the floor, between a first end 24a and an opposite second end 24b. The attachment shaft 24 extends through the at least one guiding element 22 such that the rotational center of the attachment shaft 24 is disposed on the rotational axis A1. The attachment shaft 24 further comprises an attachment element 26 disposed at the first end 24a thereof. The attachment element 26 is adapted to receive the pre-formed insert 14 such that a rotational center of the pre-formed insert 14 is substantially aligned with the rotational center of the attachment shaft 24 on the rotational axis A1 and such that rotation of the attachment shaft 24 about the rotational axis A1 facilitates a rotation of the pre-formed insert 14 about the rotational axis A1.

Referring to FIGS. 3 and 4, the attachment element 26 comprises a base 28 secured to the first end 24a of the attachment shaft 24 and a plurality of threaded bolts 30 extending from the base 28 opposite the attachment shaft 24. Each of the plurality of threaded bolts 30 is arranged to extend through a corresponding recess in the pre-formed insert 14 for aligning the rotational center of the pre-formed insert 14 with the rotational center of the attachment shaft 24. A fastener may additionally be releasably coupled to each of the plurality of threaded bolts 30 for securely and releasably affixing the pre-formed insert 14 onto the tooling apparatus 10. However, it is to be appreciated that the pre-formed insert 14 may be affixed to the first end 24a of the attachment shaft 24 in any alternative manner known in the art without varying the scope of the invention.

Figure 2:
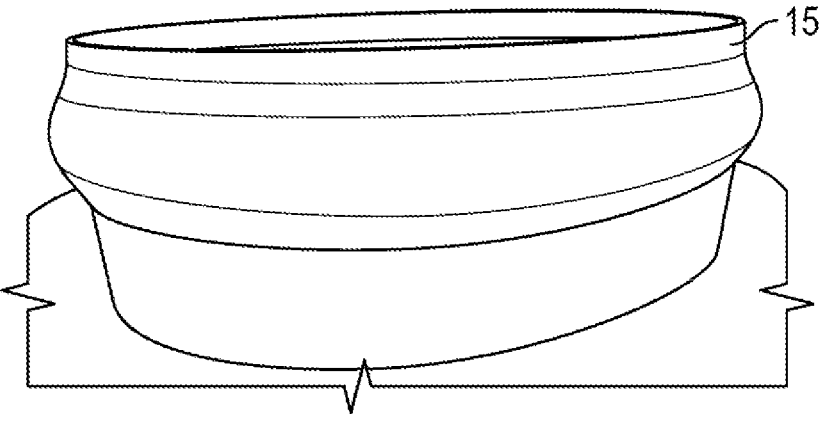
FIG. 2 is a schematic illustration of a front perspective view of a marine implement formed via the present method.

Referring still to FIGS. 3 and 4, an activation element, shown generally at 32, is operatively engaged with the second end 24b of the attachment shaft 24 to facilitate rotation of the attachment shaft 24 and, similarly, the attachment element 26 and the pre-formed insert 14 operatively engaged therewith, about the rotational axis A1 at a predetermined rotation rate. While it is appreciated that the predetermined rotation rate may differ based on a variety of factors, including the type of material 12 to be applied to the pre-formed insert 14 and the specific application for which the tooling apparatus 10 is utilized, the predetermined rotation rate is contemplated to be between 12-15 revolutions per minute (rpm) for applications in which the tooling apparatus 10 is utilized to form a marine implement, such as the fiberglass-based boat hull component 15, as shown in FIG. 2.

In a first example embodiment, the tooling apparatus 10 may be a purely mechanical embodiment of the tooling apparatus 10 shown in FIG. 3, wherein the activation element 32 comprises a mechanical crank mechanism 34 integrated with the second end 24b of the attachment shaft 24. The mechanical crank mechanism 34 is operatively connected with the second end 24b of the attachment shaft such that when the mechanical crank mechanism 34 is turned, rotational force is applied to rotate the attachment shaft 24 and the pre-formed insert 14 about the rotational axis A1. Said another way, manual rotation of the mechanical crank mechanism 34 by an operator about the rotational axis A1 in a first direction D1 correspondingly rotates the attachment shaft 24, and therefore, the pre-formed insert 14, about the rotational axis A1 in the first direction D1. Similarly, manual rotation of the mechanical crank mechanism 34 by an operator about the rotational axis A1 in a second direction D2 correspondingly rotates the attachment shaft 24, and therefore, the pre-formed insert 14, about the rotational axis A1 in the second direction D2.

In a second example embodiment, the tooling apparatus 10 may be a motorized embodiment of the tooling apparatus 10 shown in FIGS. 4-7. In such an example, the activation element 32 comprises a motor and gearbox assembly 36 operatively engaged with the second end 24b of the attachment shaft 24 such that rotation of the motor is facilitated to the attachment shaft 24 via the gearbox. The rotational energy produced by the motor and conveyed to the attachment shaft 24 via the gearbox causes rotation of the attachment shaft 24 and, therefore, the pre-formed insert 14 about the rotational axis A1 in the first direction D1 and the second direction D2. The motor and gearbox assembly 36 may be powered by a pneumatic system 38 as is known in the art. However, it is contemplated that the motor and gearbox assembly 36 may alternatively be powered by any other suitable power source known in the art, including gasoline, electric, or hydraulic power.

Referring to FIGS. 5-7, the motorized embodiment of the tooling apparatus 10 further includes a foot pedal assembly 40 having a first pedal 40a and a second pedal 40b for selective actuation of the motor and gearbox assembly 36 via the pneumatic system 38. The foot pedal assembly 40 is operatively engaged with the pneumatic system 38 and the motor and gearbox assembly 36 as is known in the art such that depressing one of the first and second pedals 40a, 40b actuates the motor and gearbox assembly 36 to rotate the pre-formed insert 14 about the rotational axis A1 in the first direction D1, and depressing the other of the first and second pedals 40a, 40b actuates the motor and gearbox assembly 36 to rotate the pre-formed insert 14 about the rotational axis A1 in the second direction D2.

Figures 8A, 8B, 8C:
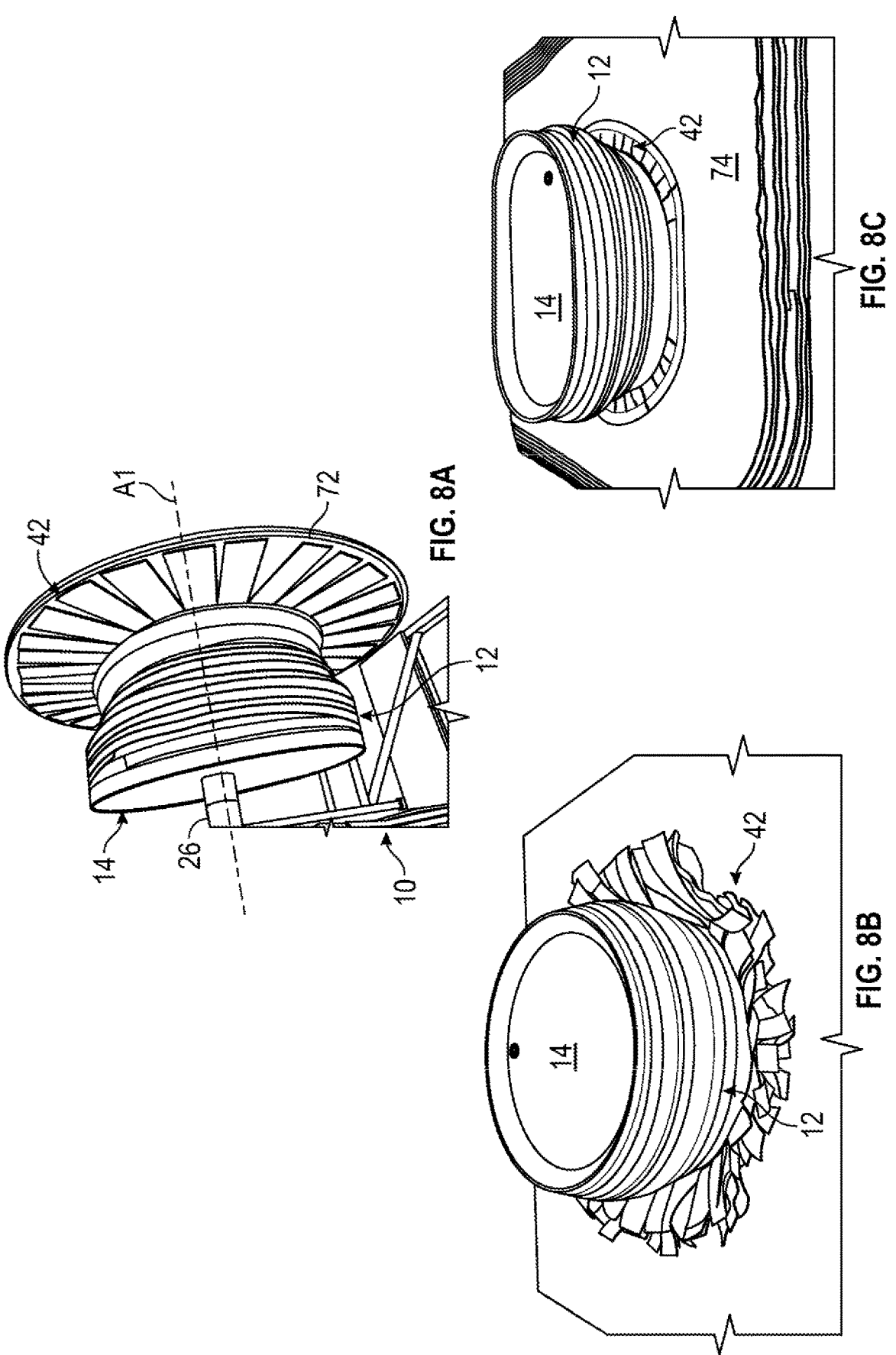
FIG. 8A is a schematic illustration of a rear fragmentary perspective view of the pre-formed insert disposed upon the attachment shaft of the tooling apparatus showing a plurality of ring tabs applied to the pre-formed insert.
FIG. 8B is a schematic illustration of a front fragmentary perspective view of the pre-formed insert and the plurality of ring tabs configured for integration with a plurality of overlapping skirt elements of an article of further manufacture.
FIG. 8C is a schematic illustration of a side fragmentary perspective view of the pre-formed insert showing the plurality of ring tabs integrated with the plurality of overlapping skirt elements of the article of further manufacture.

Alternatively, or in addition to the foot pedal assembly 40, actuation of the motor and gearbox assembly 36 may be automatically controlled by a computerized control strategy written on the non-transitory memory of a controller and transmitted over a communications network. The computerized control strategy may be deployed on any one of a number of computing devices, including, without limitation, a computer workstation, a desktop, a notebook, a laptop, a handheld computer, a mobile phone, a tablet, or some other computing device having a non-transitory computer readable medium or memory. The term non-transitory computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read, as well as networked versions of the same. The non-transitory computer readable medium or memory stores or has written or embodied thereon a set of computer executable instructions that comprise the control strategy including, but not limited to, rotating the pre-formed insert 14 a predetermined number of rotations about the rotational axis A1 in the first direction D1 and automatically stop the motor and gearbox assembly 36 following the completion of the predetermined number of rotations. Such start and stop operations within the computerized control strategy may be utilized for any of a number of purposes, including, for example, changing the type of material 12, cutting the material 12, applying a tackifier to the pre-formed insert 14, or forming a plurality of ring tabs 42 from the material 12 as may be necessary to form the fiberglass-based boat hull component 15, as shown in FIGS. 8A-8C.

Referring to FIGS. 3-7, 9A, and 9B, the tooling apparatus 10 further includes a tape control assembly, shown generally at 44, configured for tensioning the material 12 and dispensing the material 12 onto the pre-formed insert 14. The tape control assembly 44 houses a tape carrier 46 configured for holding the material 12 and dispensing the material 12 as it is applied to the pre-formed insert 14. In the example embodiments of the tooling apparatus 10 shown in the figures, the tape carrier 46 comprises a cylindrical element 48 releasably mounted between a pair of opposing walls 50a, 50b of the tape control assembly 44 and adapted for receiving, for example, a spool of the material 12, thereby releasably mounting a desired quantity of the material 12 within the tape control assembly 44.

Figure 9B:
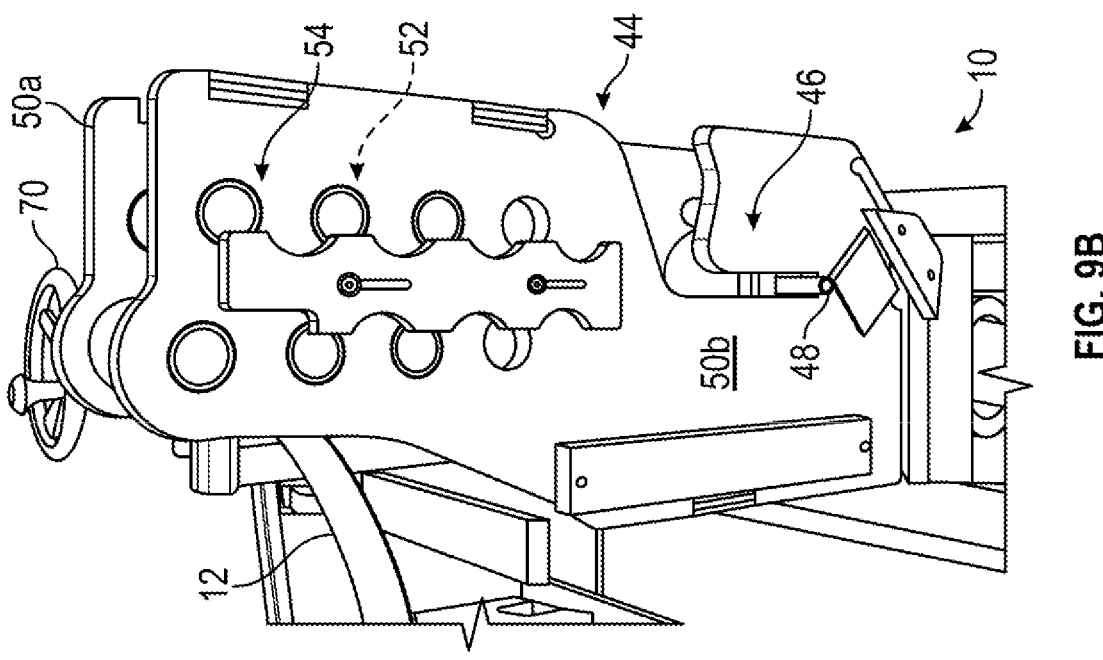
FIG. 9B is a schematic illustration of an enlarged fragmentary side perspective view showing the tape control assembly of the tooling apparatus.
Figure 9A:
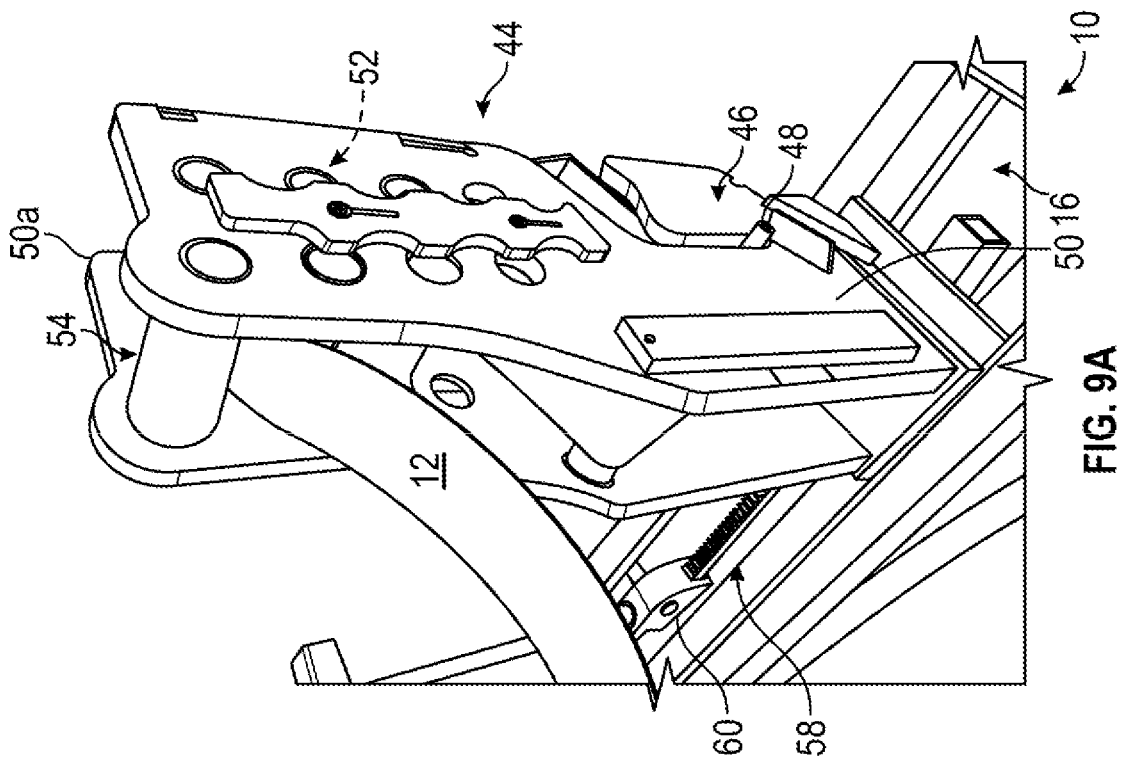
FIG. 9A is a schematic illustration of an enlarged fragmentary rear perspective view showing a tape control assembly of the tooling apparatus.

The tape control assembly 44 further includes a tensioning system 52 configured for tensioning the material 12 as the material 12 is drawn from the tape carrier 46 and applied to the pre-formed insert 14. Referring to FIGS. 7, 9A, and 9B, the tensioning system comprises a plurality of rollers 54 extending between the pair of opposing walls 50a, 50b of the tape control assembly 44. The material 12 is fed from the tape carrier 46 through the plurality of rollers 54 to increase friction and, therefore, tension as the material 12 is pulled from the tape carrier 46 and applied onto the pre-formed insert 14.

The tensioning system 52 may further comprise a set of pinch rollers 56, as shown in FIGS. 5 and 7, positioned generally adjacent to the plurality of rollers 54 and rotatable around a roller axis A3, wherein the roller axis A3 is radially spaced from and extends substantially parallel to the rotational axis A1. The material 12 is fed between each roller in the set of pinch rollers 56, such that each roller operatively engages the material 12 for further tensioning of the material 12 and assisting the material 12 with flat or uniform application when drawn from the tape carrier 46 and applied to the pre-formed insert 14. It is appreciated that the tensioning system 52 may additionally or alternatively comprise any of a number of other friction-generating devices known in the art, such as an electronic or mechanical brake assembly operatively engaged with the material 12 as it is drawn from the tape carrier 46.

Referring again to FIGS. 3-7, the tape control assembly 44 is spaced a predetermined distance from the attachment shaft 24 and disposed on a tape control axis A2, wherein the tape control axis A2 is spaced apart from and extends substantially parallel to the rotational axis A1 and the roller axis A3. In one example as shown in FIG. 5, the roller axis A3 is disposed between the rotational axis A1 and the tape control axis A2 relative to the floor. The tape control assembly 44 is configured for axial translation along the tape control axis A2 at a predetermined translation rate during rotation of the pre-formed insert 14 at the predetermined rotation rate for drawing the material 12 under tension from the tape control assembly 44 onto the pre-formed insert 14 in the predetermined arrangement. The predetermined translation rate may comprise any of a number of suitable values depending on the type of material 12 applied to the pre-formed insert 14 and a desired predetermined thickness of the material 12 on the pre-formed insert 14.

In an example embodiment for applications in which the tooling apparatus 10 is utilized to form a marine implement, such as the fiberglass-based boat hull component 15, the material 12 comprises a 4-inch fiberglass tape material. In such an example embodiment, a predetermined translation rate of 1.33 inches along the tape control axis A2 per each rotation of the pre-formed insert 14 about the rotational axis A1 would provide a 3-ply layer of the example 4-inch fiberglass tape material across the pre-formed insert 14. Such 4-inch fiberglass tape material is, in one example, commercially available as 4" Vectorply 2803-10SY fiberglass tape. The example Vectorply 2803-10SY fiberglass tape is contemplated to be particularly effective due to its composition as a highly conformable knit fabric with a stabilizing roving, thereby allowing the material 12 to lay flat over changing chord widths when applied under tension to the pre-formed insert 14.

Figure 10:
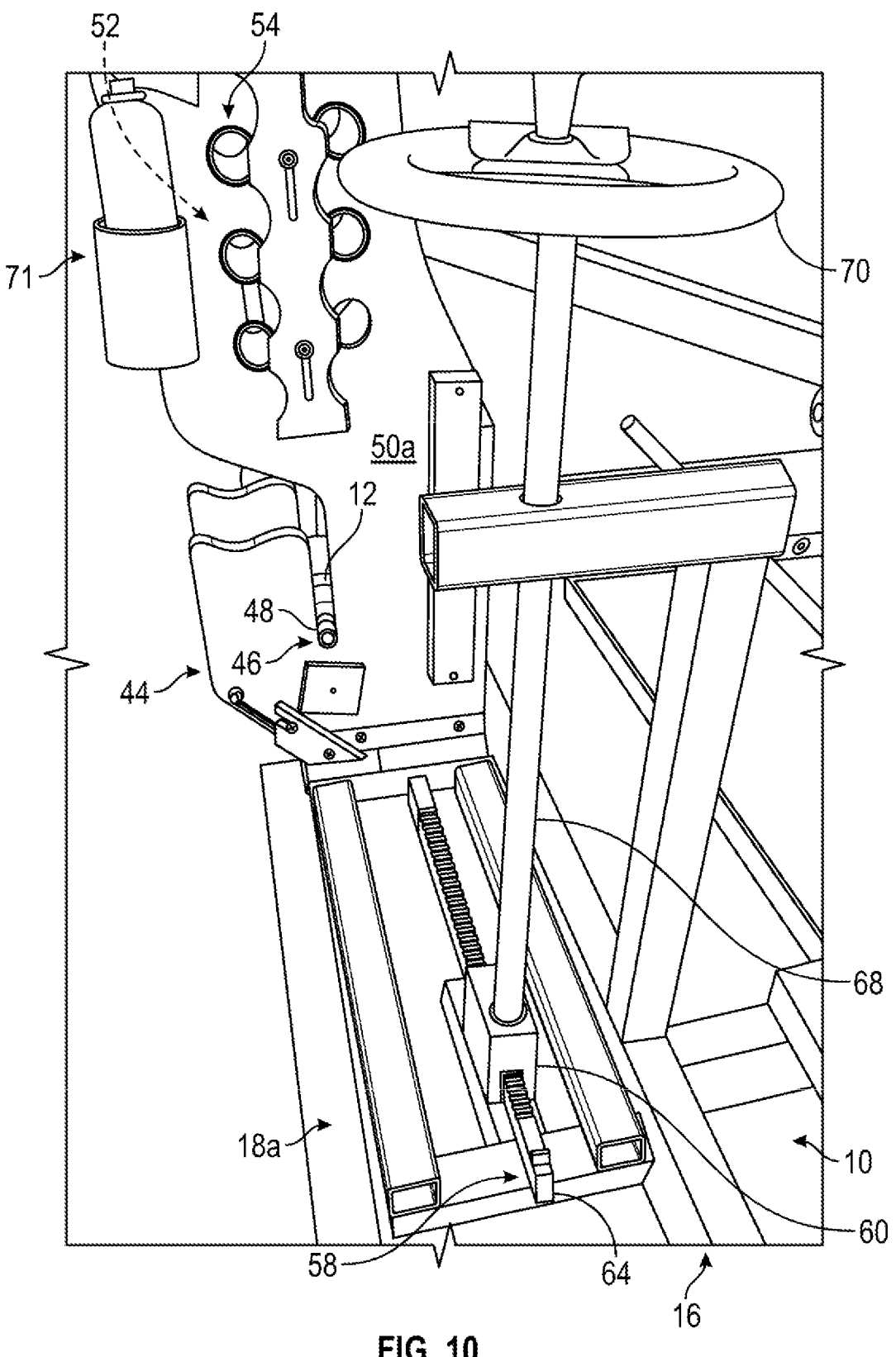
FIG. 10 is a schematic illustration of an enlarged fragmentary side perspective view showing the tape control assembly and a rack and pinion assembly of the tooling apparatus.
Figure 11:
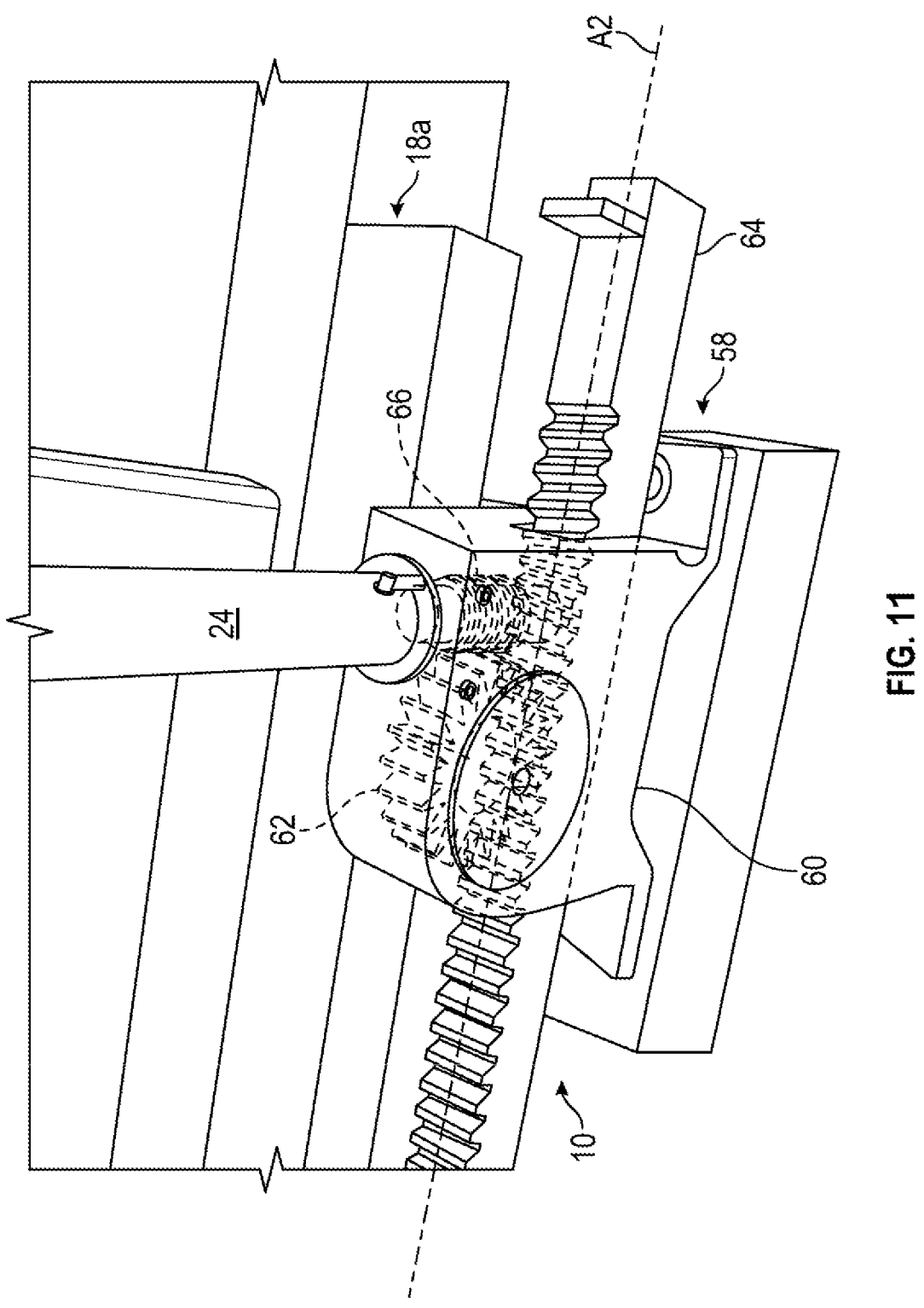
FIG. 11 is a schematic illustration of an enlarged fragmentary front perspective view showing the rack and pinion assembly of the tooling apparatus.

The tooling apparatus 10 further includes a rack and pinion assembly 58 adapted and arranged for facilitating axial translation of the tape control assembly 44 along the tape control axis A2. Referring to FIGS. 10 and 11, the rack and pinion assembly 58 comprises a body 60 coupled to the first plurality of supports 18a. As is known in the art, a pinion element 62 is rotatably mounted within the body 60 and is operatively engaged with a rack element 64 disposed generally along the tape control axis A2 and affixed to the tape control assembly 44. A worm gear 66 positioned within the body 60 is operatively engaged with the pinion element 62 such that rotation of the worm gear 66 correspondingly rotates the pinion element 62 to generate linear motion of the rack element 64 and, correspondingly, translation of the tape control assembly 44 along the tape control axis A2.

Rotation of the worm gear 66 is facilitated via a shaft 68 coupled thereto, wherein the shaft 68 extends vertically through the body 60 and terminates at a handwheel 70. As such, the operator can simultaneously operate the handwheel 70 and the first and second pedals 40a, 40b of the foot pedal assembly 40 to control both translation of the tape control assembly 44 on the tape control axis A2 and rotation of the pre-formed insert 14 about the rotational axis A1, thereby permitting the material 12 to be drawn under tension from the tape control assembly 44 onto the pre-formed insert 14 in the predetermined arrangement.

Alternatively, translation of the tape control assembly 44 on the tape control axis A2 may be actuated by a translation motor operatively engaged with the rack element 64 and automatically controlled by a computerized control strategy written on the non-transitory memory of the controller and transmitted over the communications network. For example, the computerized control strategy may include programmable instructions for the translation motor to translate the tape control assembly 44 at the predetermined translation rate and additionally hold the tape control assembly 44 at various predetermined positions along the tape control axis A2 for applying the material 12 in the predetermined arrangement on the pre-formed insert 14.

In example embodiments of the tooling apparatus 10 automatically controlled by the computerized control strategy, the tooling apparatus 10 may additionally include an integrated sensor positioned in the tape control assembly 44 generally adjacent to the tape carrier 46 for monitoring an amount of material 12 remaining on the tape carrier 46 and signaling to the controller when the material 12 remaining on the tape carrier 46 passes a predefined low threshold. Upon receiving the signal that the material 12 has passed the predefined low threshold, the controller automatically stops the motor and gearbox assembly 36 so that the material 12 on the tape carrier 46 may be replaced by an operator or via other means known in the art.

The tooling apparatus 10 may further comprise a cutting device operatively engaged with the tape control assembly 44 for selectively cutting the material 12. The cutting device may be automatically controlled by a computerized control strategy written on memory of the controller and transmitted over the communications network. For example, the computerized control strategy may include programmable instructions to cut the material 12 using the cutting device once the material 12 on the pre-formed insert 14 reaches the predetermined thickness or a specified number of rotations of the pre-formed insert 14 have been completed. Alternatively, it is appreciated that the material 12 may be cut manually by the operator once the material 12 on the pre-formed insert 14 reaches the predetermined thickness or a specified number of rotations of the pre-formed insert 14 have been completed.

The tooling apparatus 10 may additionally include a sprayer system 71 configured for applying a uniform layer of tackifier to the pre-formed insert 14 for securing the material 12 thereto. One such commercially available tackifier includes 3M Super 77 Multipurpose Spray Adhesive. The sprayer system 71 may be spaced a predetermined distance from the attachment shaft 24 and positioned on a sprayer axis A4, wherein the sprayer axis A4 is spaced apart from and extends substantially parallel to the rotational axis A1, tape control axis A2, and roller axis A3. The sprayer system 71 may therefore be adapted for axial translation along the sprayer axis A4 in coordination with axial translation of the tape control assembly 44 along the tape control axis A2 for automatically applying the tackifier to each successive layer of the material 12 applied to the pre-formed insert 14 according to a computerized control strategy written on the non-transitory memory of the controller and transmitted over the communications network. Alternatively, it is appreciated that an operator may manually operate the sprayer system 71 to apply the tackifier to the pre-formed insert 14 for securing the material 12 thereto, or the tackifier may be applied manually to the pre-formed insert 14 without use of the sprayer system 71.

Figure 12:
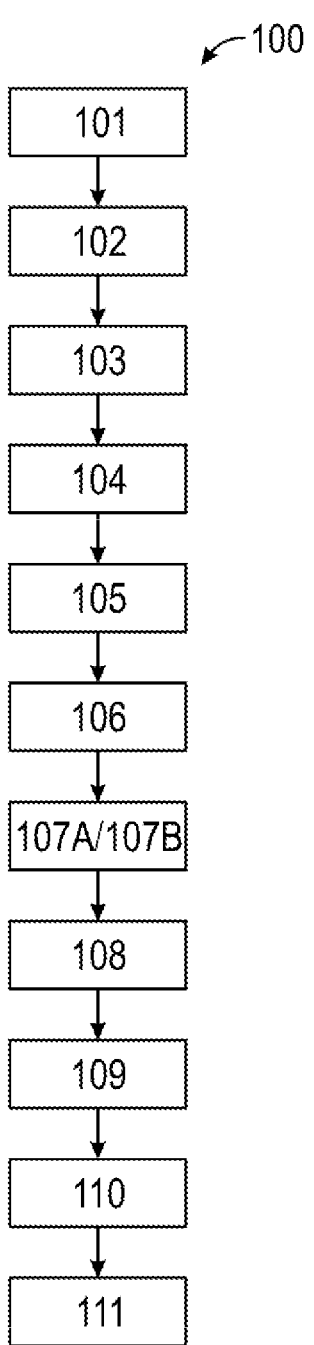
FIG. 12 is a flow chart detailing the steps of the present method of forming the marine implement or another implement requiring a more robust or thicker application of fiberglass material in formation.

As detailed in the flow chart provided as FIG. 12, in operation, the tooling apparatus 10 may be utilized to form a marine implement, such as the fiberglass-based boat hull component 15 or another implement requiring a more robust or thicker application of fiberglass material in formation. As such, in the marine implement example, the marine implement is so formed via the tooling apparatus 10 according to the present method 100. Initially, at step 101, at least one insert flange 72 is secured to the pre-formed insert 14, wherein the at least one insert flange 72 is configured to replicate a portion of a fiberglass boat hull for eventual integration of the fiberglass-based boat hull component 15 therewith. Once the at least one insert flange 72 is attached to the pre-formed insert 14, at step 102, at least one of a barrier coat, a skin coat, or a gel coat is applied to an outer surface of the pre-formed insert 14 in a manner known in the art. At step 103, a curing process is initiated and completed for the respective barrier coat, skin coat, or gel coat.

At step 104, the pre-formed insert 14 is loaded by an operator onto the attachment element 26 of the tooling apparatus 10 such that the threaded bolts 30 are received by the corresponding recesses in the pre-formed insert 14, thereby substantially aligning the rotational center of the attachment shaft 24 and the rotational center of the pre-formed insert 14 on the rotational axis A1 for selective rotation thereabout. At step 105, the tackifier (e.g., 3M Super 77 Multipurpose Spray Adhesive) is applied to the outer surface of the pre-formed insert 14. The tackifier may be applied manually to the pre-formed insert 14 by the operator or automatically via the sprayer system 71 as part of the computerized control strategy as detailed herein.

Once the tackifier is applied to the outer surface of the pre-formed insert 14, at step 106, at least one continuous strip of fiberglass tape material 12 is manually drawn by an operator from the tape control assembly 44, and a distal end of the at least one continuous strip of fiberglass tape material 12 is secured to the pre-formed insert 14 using the tackifier. The at least one continuous strip of fiberglass tape material 12 is thereby drawn through and tensioned by the plurality of rollers 54 and the set of pinch rollers 56 of the tensioning system 52, as shown in FIG. 7.

At step 107A, the activation element 32 is actuated to rotate the attachment shaft 24, and therefore, the pre-formed insert 14 about the rotational axis A1 at the predetermined rotation rate, which, for forming the fiberglass-based boat hull component 15, is contemplated to be between 12-15 rpm. In a mechanical embodiment of the tooling apparatus 10 shown in FIG. 3, the pre-formed insert 14 is rotated manually about the rotational axis A1 in either the first direction D1 or the second direction D2 via corresponding rotation of the mechanical crank mechanism 34 by the operator in either the first direction D1 or the second direction D2, respectfully.

In the motorized embodiment of the tooling apparatus 10, the pre-formed insert 14 is selectively rotated about the rotational axis A1 at the predetermined rotation rate by corresponding actuation of the motor and gearbox assembly 36 via the foot pedal assembly 40 and pneumatic system 38. Depressing one of the first and second pedals 40a, 40b activates the pneumatic system 38, thereby actuating the motor and gearbox assembly 36 in a manner known in the art to rotate the pre-formed insert 14 about the rotational axis A1 in the first direction D1. Depressing the other of the first and second pedals 40a, 40b similarly activates the pneumatic system 38, thereby actuating the motor and gearbox assembly 36 in a manner known in the art to rotate the pre-formed insert 14 about the rotational axis A1 in the second direction D2. Alternatively, the pre-formed insert 14 may be rotated about the rotational axis A1 at the predetermined rotation rate in either the first direction D1 or the second direction D2 by the motor and gearbox assembly 36 automatically via a computerized control strategy as detailed herein.

At step 107B, which is completed simultaneously and in coordination with step 107A, the tape control assembly 44 begins translation along the tape control axis A2 at the predetermined translation rate. The predetermined translation rate for forming the fiberglass-based boat hull component 15 is initially contemplated to be 1.33 inches of translation along the tape control axis A2 per rotation of the pre-formed insert 14 about the rotational axis A1, thereby providing a 3-ply layer of 4-inch fiberglass tape material across the pre-formed insert 14.

Translation of the tape control assembly 44 at the predetermined rotation rate is facilitated by the operator via manual rotation of the handwheel 70, which is completed simultaneously with actuation by the operator of the foot pedal assembly 40 for rotation of the pre-formed insert 14 at the predetermined rotation rate as described above in step 107A. Rotation by the operator of the handwheel 70 correspondingly rotates the shaft 68, which further rotates the worm gear 66 operatively engaged with the pinion element 62. Rotation of the worm gear 66 thereby rotates the pinion element 62 to generate linear motion of the rack element 64 and, correspondingly, translation of the tape control assembly 44 along the tape control axis A2 at the predetermined translation rate. Alternatively, translation of the tape control assembly 44 at the predetermined translation rate may be facilitated via actuation of the translation motor operatively engaged with the rack element 64 and automatically controlled by the computerized control strategy as detailed herein.

At step 108, during translation of the tape control assembly 44 at the predetermined translation rate, the at least one continuous strip of fiberglass tape material 12, the distal end of which was previously secured to the pre-formed insert 14 at step 106, is drawn from the tape carrier 46 due to rotation of the pre-formed insert 14 at the predetermined rotation rate. Accordingly, the at least one continuous strip of fiberglass tape material 12 is pulled through the plurality of rollers 54 and the set of pinch rollers 56 onto the pre-formed insert 14, as shown in FIG. 7, thereby wrapping the at least one continuous strip of fiberglass tape material 12 about the pre-formed insert 14 under tension and forming the plurality of overlapping layers in the predetermined arrangement.

Figure 13:
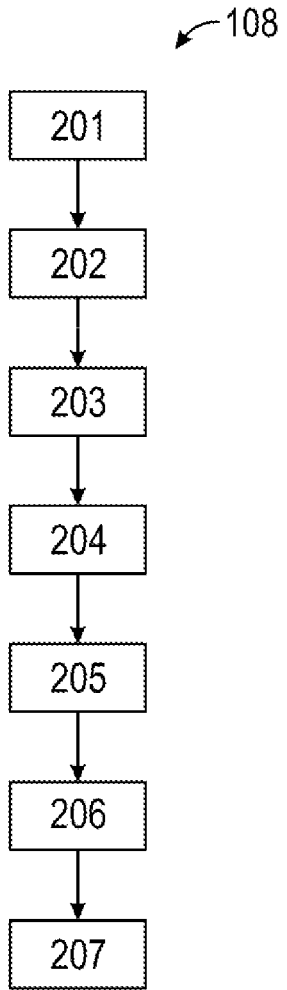
FIG. 13 is a flow chart detailing the sub-steps 201-207 of step 108 of the present method of wrapping a tape material under tension about the pre-formed insert.

Step 108, namely, wrapping the at least one continuous strip of fiberglass tape material 12 about the pre-formed insert 14 is, in a first example, further defined in FIG. 13 via sub-steps 201-207, wherein the at least one continuous strip of fiberglass tape material 12 comprises a first continuous strip of fiberglass tape material (e.g., Vectorply 2803-10SY) and at least one second continuous strip of fiberglass tape material (e.g., Vectorply 5615).

At step 201, the first continuous strip of fiberglass tape material is drawn from the tape carrier 46, tensioned by the tensioning system 52, and applied to the pre-formed insert 14 as described above until at least one layer or a plurality of overlapping layers of the first continuous strip of fiberglass tape material reaches a first predetermined thickness. The first predetermined thickness for forming the fiberglass-based boat hull component 15 is initially contemplated to correspond to a 3-ply layer of the first continuous strip of fiberglass tape material across the pre-formed insert 14. A 3-ply layer of a suitable material, such as Vectorply 2803-10SY, ranges from about 0.05 inches to about 0.15 inches thick following consolidation under vacuum pressure. In one example, the 3-ply layer was about 0.10 inches thick following consolidation under vacuum pressure. Once the plurality of overlapping layers of the first continuous strip of fiberglass tape material reaches the first predetermined thickness, at step 202, the first continuous strip of fiberglass tape material is cut by the cutting device or manually by the operator. At step 203, the tackifier is applied to an outermost overlapping layer of the first continuous strip of fiberglass tape material laid on the pre-formed insert 14.

Hand-application of the at least one second continuous strip of fiberglass tape material is contemplated to be particularly effective for the formation of the fiberglass-based boat hull component 15. As such, at step 204, the at least one second continuous strip of fiberglass tape material is cut to a predetermined size using the cutting device or manually by the operator before application to the pre-formed insert 14. The predetermined size may be, by way of non-limiting example, an amount of material such that each of the at least one second continuous strip of fiberglass tape material is adapted to cover either one-third of the circumference of the pre-formed insert 14, half of the circumference of the pre-formed insert 14, or the entire circumference of the pre-formed insert 14.

At step 205, the plurality of ring tabs 42 are then pattern-cut into each of the at least one second continuous strip of fiberglass tape material, either using a cutting apparatus known in the art, such as a CNC machine, or manually by the operator. Alternatively, the predetermined size of the at least one second continuous strip of fiberglass tape material may comprise a smaller amount of tape material such that each of the at least one second continuous strip of fiberglass tape material cut by the cutting device or the operator defines one of the plurality of ring tabs 42, and accordingly, step 205 can therefore be omitted.

Once the plurality of ring tabs 42 are formed, at step 206, the at least one second continuous strip of fiberglass tape material is hand-applied by an operator onto the pre-formed insert 14 such that the plurality of ring tabs 42 are positioned to extend radially from the pre-formed insert 14 adjacent to the at least one insert flange 72, as shown in FIGS. 8A-8C. The at least one second continuous strip of fiberglass tape material is hand-applied to the pre-formed insert 14 until the plurality of overlapping layers of the first continuous strip of fiberglass tape material and the at least one layer of the at least one second continuous strip of fiberglass tape material on the pre-formed insert 14 collectively reaches a second predetermined thickness. The second predetermined thickness for forming the fiberglass ring insert is initially contemplated to correspond to a 1-ply layer of the at least one second continuous strip of fiberglass tape material combined with the 3-ply layer of the first continuous strip of fiberglass tape material across the pre-formed insert 14. A 1-ply layer of a suitable material, such as Vectorply 5615, ranges from about 0.05 inches to about 0.15 inches thick following consolidation under vacuum pressure. In one example, the 1-ply layer was about 0.10 inches thick following consolidation under vacuum pressure. As such, the second predetermined thickness comprises the collective thicknesses of the 3-ply layer of the first continuous strip of fiberglass tape material and the 1-ply layer of the at least one second continuous strip of fiberglass tape material and ranges from about 0.10 inches to about 0.30 inches following consolidation under vacuum pressure. In one example, wherein the first continuous strip of fiberglass tape material is Vectorply 2803-10SY and the second continuous strip of fiberglass tape material is Vectorply 5615, the second predetermined thickness is about 0.19 inches.

Alternatively, it is appreciated that the at least one second continuous strip of fiberglass tape material may be applied in a continuous manner similar to that of the first continuous strip of fiberglass tape material without varying the scope of the innovation. For example, the at least one second continuous strip of fiberglass tape material may be drawn continuously from the tape carrier 46 and applied under tension onto the pre-formed insert 14 via the tensioning system 52 until the at least one layer of the at least one second continuous strip of fiberglass tape material on the pre-formed insert 14 reaches the second predetermined thickness. Then, once the at least one layer of the at least one second continuous strip of fiberglass tape material reaches the second predetermined thickness, the at least one second continuous strip of fiberglass tape material may be cut by the cutting device or manually by the operator. Referring again to FIGS. 8A and 8B, the at least one second continuous strip of fiberglass tape material can then be further cut, either manually by an operator, the cutting device, or a cutting apparatus known in the art (such as a CNC machine) to form the plurality of ring tabs 42 extending radially from the pre-formed insert 14.

At step 207, the tackifier is applied to an outermost layer of the at least one second continuous strip of fiberglass tape material applied to the pre-formed insert 14. Steps 201-207 can then be repeated to reach a collective implement thickness of the fiberglass tape material comprising the first continuous strip of fiberglass tape material and the at least one second continuous strip of fiberglass tape material applied to the pre-formed insert 14. The overall desired thickness for forming the fiberglass-based boat hull component 15 is initially contemplated to correspond to a total of ten 3-ply layers of the first continuous strip of fiberglass tape material and nine 1-ply layers of the at least one second continuous strip of fiberglass tape material collectively applied to the pre-formed insert 14. Such an overall desired thickness in one example totals about 2.0 inches inclusive of the at least one of the barrier coat, the skin coat, or the gel coat, following consolidation under vacuum pressure.

Referring back to FIG. 12, once the collective implement thickness of the fiberglass tape material is applied to the pre-formed insert 14 in the predetermined arrangement and reaches the overall desired thickness, at step 109, the pre-formed insert 14 is manually unloaded by an operator from the attachment element 26 of the tooling apparatus 10. Once unloaded, at step 110, the at least one insert flange 72 is also removed from the pre-formed insert 14, and the pre-formed insert 14, now having the plurality of overlapping layers of the at least one continuous strip of fiberglass tape material 12, at step 111, is further processed for integration into the fiberglass boat hull. For example, referring to FIG. 8C, the plurality of ring tabs 42 may be interwoven with a plurality of overlapping fiberglass skirt elements 74 of an article of further manufacture for integration of the fiberglass-based boat hull component 15 into the fiberglass boat hull.

While various embodiments have been described, the description is intended to be exemplary, rather than limiting and it will be apparent to those of ordinary skill in the art that many more embodiments and implementations are possible that are within the scope of the embodiments. While some of the best modes and other embodiments for carrying out the present teachings have been described in detail, various alternative designs and embodiments exist for practicing the present teachings defined in the appended claims. Any feature of any embodiment may be used in combination with or substituted for any other feature or element in any other embodiment unless specifically restricted. Accordingly, the embodiments are not to be restricted except in light of the attached claims and their equivalents. Many modifications and variations of the present invention are possible in light of the above teachings and within the scope of the attached claims. It is, therefore, to be understood that within the scope of the appended claims, the invention may be practiced other than as specifically described.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. A tooling apparatus for applying a material to a pre-formed insert, the tooling apparatus comprising:
an apparatus frame having a guiding element and an attachment shaft defining a rotational axis, wherein the attachment shaft is operatively coupled to the apparatus frame at the guiding element and is adapted to receive the pre-formed insert thereon such that the pre-formed insert is configured for rotation about the rotational axis;
an activation element operatively engaged with the attachment shaft to facilitate rotation of the attachment shaft and the pre-formed insert about the rotational axis at a predetermined rotation rate;
a tape control assembly spaced apart from the attachment shaft and capable of axial translation along a tape control axis at a predetermined translation rate, wherein the tape control axis is spaced apart from and substantially parallel with the rotational axis, and wherein the tape control assembly comprises:
a floor;
a pair of opposing walls;
a tape carrier configured to convey a tape material to the tensioning system, the tape carrier being releasably mounted between the pair of opposing walls;
a tensioning system disposed between the pair of opposing walls, the tensioning system comprising:
a plurality of pinch rollers extending between the pair of opposing walls, wherein the plurality of pinch rollers is rotatable about a roller axis that is disposed between the rotational axis and the tape control axis relative to the floor of the tape control assembly and radially spaced from and extends substantially parallel to the rotational axis; and
a plurality of rollers extending between the pair of opposing walls and disposed between the tape carrier and the plurality of pinch rollers; and
wherein actuation of the activation element and thereby rotation of the pre-formed insert about the rotational axis at the predetermined rotation rate, and translation of the tape control assembly at the predetermined translation rate, causes the tape material to be drawn under tension and applied from the tape control assembly to the pre-formed insert in a plurality of overlapping layers, wherein the plurality of overlapping layers defines a predetermined arrangement.

2. The apparatus of claim 1 wherein the plurality of overlapping layers of material applied to the pre-formed insert comprises a plurality of layers of a first material and at least one layer of a second material, and wherein the plurality of layers of the first material and the at least one layer of the second material each have a predetermined thickness.

3. The apparatus of claim 2 wherein the predetermined thickness of the plurality of layers of the first material and the at least one layer of the second material collectively comprise a collective implement thickness.

4. The apparatus of claim 3 wherein the at least one layer of the second material further comprises a plurality of ring tabs adapted for integrating the implement with a portion of a boat hull.

5. The apparatus of claim 4 wherein the first material and the second material each comprise a tape material.

6. The apparatus of claim 5 wherein the tape material of the first material or second material comprises a fiberglass tape material.

7. The apparatus of claim 6 wherein the first material comprises a first fiberglass tape material and the second material comprises a second fiberglass tape material, and wherein the first fiberglass tape material is different than the second fiberglass tape material.

8. The apparatus of claim 1 further comprising a rack and pinion assembly operatively coupled to the tape control assembly and configured to facilitate axial translation of the tape control assembly along the tape control axis at the predetermined translation rate.

9. The apparatus of claim 1 wherein the activation element comprises a mechanical crank mechanism integrated with the attachment shaft and adapted to be manually actuated by an operator.

10. The apparatus of claim 1 wherein the activation element comprises a motor and gearbox assembly operatively engaged with the attachment shaft, such that a rotation of the motor is transitioned into a rotation of the attachment shaft about the rotational axis via the gearbox assembly to thereby facilitate rotation of the pre-formed insert disposed on the attachment shaft.

11. The apparatus of claim 10 wherein the motor and gearbox assembly is controlled by a computerized control strategy written on the tangible, non-transitory memory of a controller and transmitted over a communications network.

12. The apparatus of claim 11 wherein the activation element is actuated by a foot pedal assembly operatively engaged therewith.

* * * * *